(12) United States Patent
Davis

(10) Patent No.: US 7,309,102 B1
(45) Date of Patent: Dec. 18, 2007

(54) SEAT NET

(76) Inventor: Gailynn B. Davis, 518 Leaf Cir., Deland, FL (US) 32724

( * ) Notice: Subject to any disclaimer, the term of this patent is extended or adjusted under 35 U.S.C. 154(b) by 0 days.

(21) Appl. No.: 11/439,284

(22) Filed: May 24, 2006

(51) Int. Cl.
  *A47C 7/62* (2006.01)
(52) U.S. Cl. ............ 297/188.06; 297/182; 297/228.11; 224/275
(58) Field of Classification Search ................ 297/229, 297/228.1, 228.11, 228.12, 224, 188.01, 188.04, 297/188.06, 188.2, 182; 224/275
See application file for complete search history.

(56) References Cited

U.S. PATENT DOCUMENTS

| | | | |
|---|---|---|---|
| 5,354,119 A | 10/1994 | Nicholas | |
| 5,383,727 A | 1/1995 | Rife | |
| D406,096 S | 2/1999 | Lucas | |
| 6,053,570 A * | 4/2000 | Stern et al. | 297/188.01 X |
| 6,079,773 A * | 6/2000 | Hassan | 297/188.04 |
| 6,183,177 B1 | 2/2001 | Dalgren | |
| 6,318,611 B1 | 11/2001 | Alexander | |
| 6,742,837 B1 | 6/2004 | Alexander | |
| 6,763,986 B2 | 7/2004 | Santos | |
| 6,796,469 B2 | 9/2004 | Lofaro | |
| D508,360 S | 8/2005 | Inman | |
| 7,066,535 B2 * | 6/2006 | Moses | 297/229 |
| 2002/0011505 A1 | 1/2002 | Cole | |
| 2005/0084359 A1 | 4/2005 | Dempsey | |
| 2005/0161480 A1 | 7/2005 | Rirey | |

FOREIGN PATENT DOCUMENTS

| | | |
|---|---|---|
| EP | 1227952 | 8/2002 |
| WO | WO 200554009 | 6/2005 |

* cited by examiner

*Primary Examiner*—Anthony D. Barfield
(74) *Attorney, Agent, or Firm*—Timothy L. Hughes; Meier, Bonner, et al.

(57) ABSTRACT

The Seat Net prevents items placed on a bucket-style seat of an automobile from falling onto the floor, while still allowing the automobile driver convenient access to any items so placed while driving. The Seat Net helps drivers maintain safe driving practices by eliminating the need for drivers to lean into the passenger side of the vehicle, thereby diverting their attention from the road, to reach for fallen items. The Seat Net has a mesh material combined with a series of straps which allow for easy loading and retrieval of items and rapid attachment of the Seat Net device to bucket-style passenger seats of various sizes.

7 Claims, 3 Drawing Sheets

SEAT NET

BACKGROUND OF THE INVENTION

1. Field of the Invention

This invention allows the safe and effective restraint of various shaped and sized items placed on a vehicle's bucket style passenger seat, while allowing the driver full and easy access to said items if necessary. The invention ultimately helps drivers practice safe driving habits by preventing items from flying or falling inside the vehicle which distracts drivers and causes drivers to reach for fallen items, often resulting in harm or injury to the driver, the vehicle, and other drivers and their vehicles on the road.

2. Background of the Invention and Related Art

With the continuing increase in population and urbanization of society, people are spending more time in their automobile than ever before. Particularly for those working in an office setting in or near cities, the daily commute to and from work is often lengthy. People have sought to make more efficient use of their travel time, regularly seeking to accomplish work, make phone calls, review documents or other reading materials, put makeup on, eat and even work on a laptop computer. Frequently, items related to these and other activities are placed on the passenger seat, within the driver's reach. Unfortunately, sudden stops, quick turns and other unexpected automobile movements often send anything resting on the passenger seat flying through the air, landing in places that are difficult for the driver to reach. The driver's attention is frequently diverted from safely operating the automobile by both the automatic response of trying to retrieve a falling item and thereafter attempting to recover the item from the floor. These circumstances present a significant safety hazard. In many cases, the items land in places completely out of the driver's reach, preventing the driver from utilizing the items until the destination is reached.

The Seat Net is a flexible, new product that easily slips over any bucket style passenger seat of a car, truck, van, SUV, or other vehicle, securing multiple sized and shaped items placed on the passenger seat from falling onto the floor, slipping between the seat and console or falling between the seat and passenger door when the automobile is in motion.

The Seat Net not only maintains items on the passenger seat, but it allows the driver to organize items on the passenger seat, if desired, and affords the driver fast and efficient access to a desired item by allowing the driver's hand to pass between the netting—passenger seat back interface at any point. In addition, the Seat Net can be quickly removed to accommodate an incoming passenger to the seat, then just as quickly reinstalled by the driver while sitting in the driver's seat.

Seat Net is designed to fit snugly over any standard size passenger bucket style seat, securing multiple sized items from falling or slipping off the seat. Examples of items include books, files, file folders, laptop computer, brief case, cell phone, ladies purse, small travel bags, take-out food, groceries, laundry, boxes and bottles. The Seat Net strap system allows for more or less restriction of items and creates a safe way to remove the risk of items falling forward onto the vehicle floor or sliding sideways and landing between the seat and the passenger door or the seat and the vehicle console.

Seat Net also helps drivers utilize safe driving practices. Driver distraction caused by falling or moving items inside the vehicle often becomes a driving hazard for both the operator of the vehicle and other vehicles on the road. The Seat Net helps drivers maintain continuous eye contact with the road while the vehicle is in motion, by preventing items from falling or shifting while the vehicle is in motion, diverting the driver's attention from the road.

Drivers who lean over to the passenger side of a vehicle in an attempt to retrieve fallen items, while the vehicle is either moving or stopped, has been proven to be a leading cause of serious accidents. The Seat Net eliminates this threat of harm by not only securing items safely to the passenger seat, but by also allowing drivers easy access to the items.

Other devices intended to assist drivers do not allow for an organized placement of items on the passenger seat, limit a driver's ability to access items while driving, and do not allow the driver to obtain a desired item in a quick, efficient manner. An example of such a device can be found in U.S. Pat. No. 5,354,119.

Other devices provide pockets for items, thereby limiting the size and quantity of items that can be stored within easy reach of the driver. An example of such a device can be found in U.S. Pat. No. 6,763,986.

Still other devices are designed to provide storage for small items in an unorganized fashion. An example of such a device can be found in U.S. Pat. No. 5,383,727.

SUMMARY OF THE INVENTION

The Seat Net fits over the entire bucket-style passenger seat bottom, both sides of a bucket-style passenger seat and attaches to the bucket-style passenger seat back. The Seat Net provides an efficient way to make items resting on an automobile's passenger seat accessible to a driver while preventing the items from falling off the passenger seat.

It is a primary object of the present invention to use the entire horizontal surface of an automobile's front passenger seat as a driver-accessible temporary storage space, while preventing any stored items from falling off the seat.

A further object of the present invention is to afford the automobile driver visual reference to items placed on the passenger seat under the seat net and, if necessary, offering safe, easy access to these items while safely operating the vehicle.

A further object of the present invention is to allow items of various sizes and shapes to be loaded onto the vehicle's front passenger seat and safely secured during transportation to their destination.

A still further object of the present invention is to help drivers utilize safe driving practices by eliminating the need for drivers to lean into the passenger side of the vehicle in an attempt to recover items falling or fallen from the front passenger seat, which diverts the driver's attention from the road.

BRIEF DESCRIPTION OF THE DRAWINGS

The invention, together with the other objects, features, aspects and advantages thereof, will be more clearly understood from the following in conjunction with the accompanying drawings.

Three sheets of drawings are provided. Sheet one contains FIG. 1. Sheet two contains FIG. 2. Sheet three contains FIG. 3.

DETAILED DESCRIPTION OF THE PREFERRED EMBODIMENT

Figure 1:
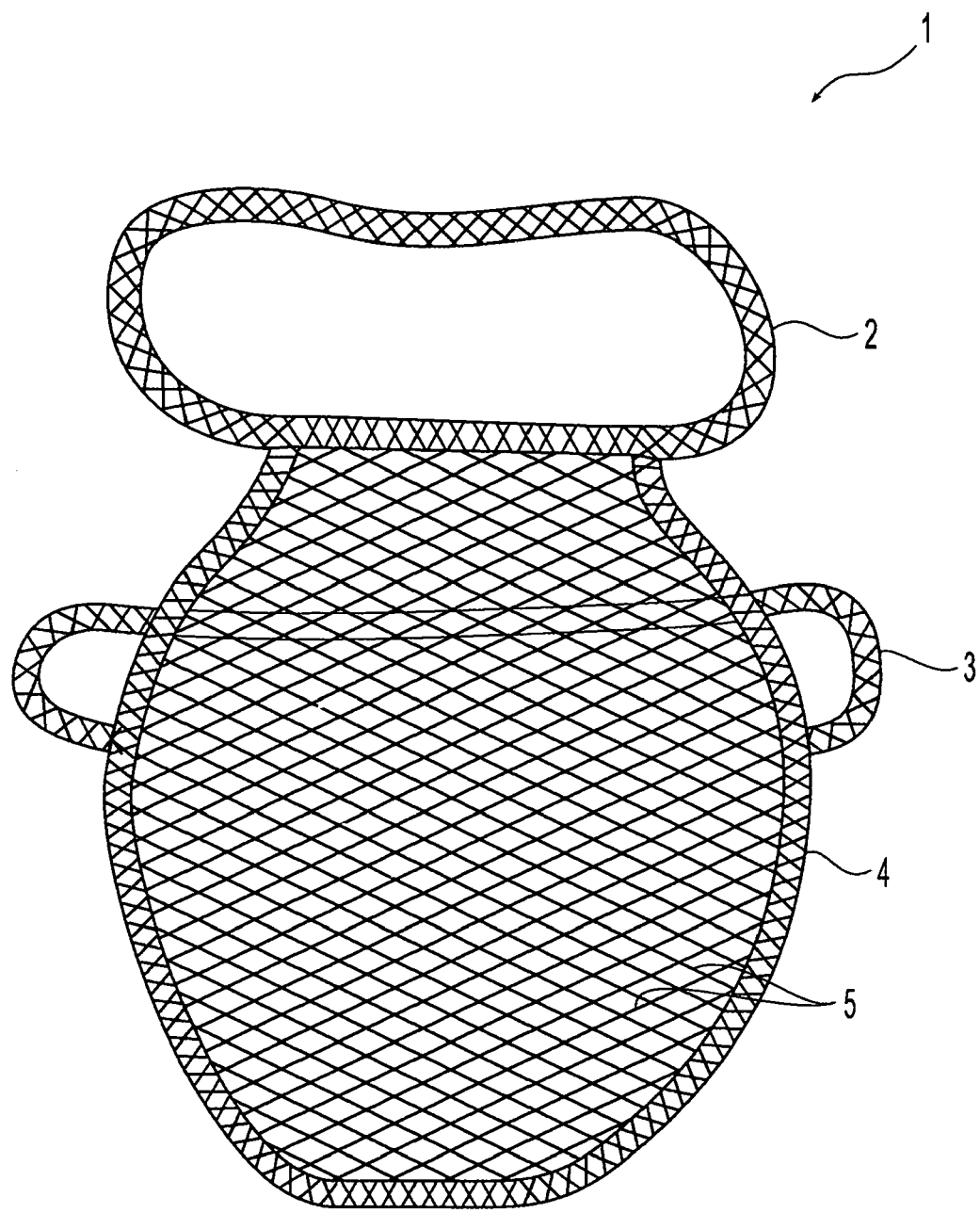
FIG. 1 is a plan view illustration of the Seat Net.

As shown in FIG. 1, the Seat Net 1 includes an upper seat strap 2, a lower seat strap 3, a loop strap 4, and mesh material 5. The edges of the mesh material 5 may be attached to the upper strap 2 and loop strap 4 by sewing or any other known means. The upper seat strap 2, and lower seat strap 3 may be joined to the loop strap 5 by sewing or any other known means.

Figure 2:
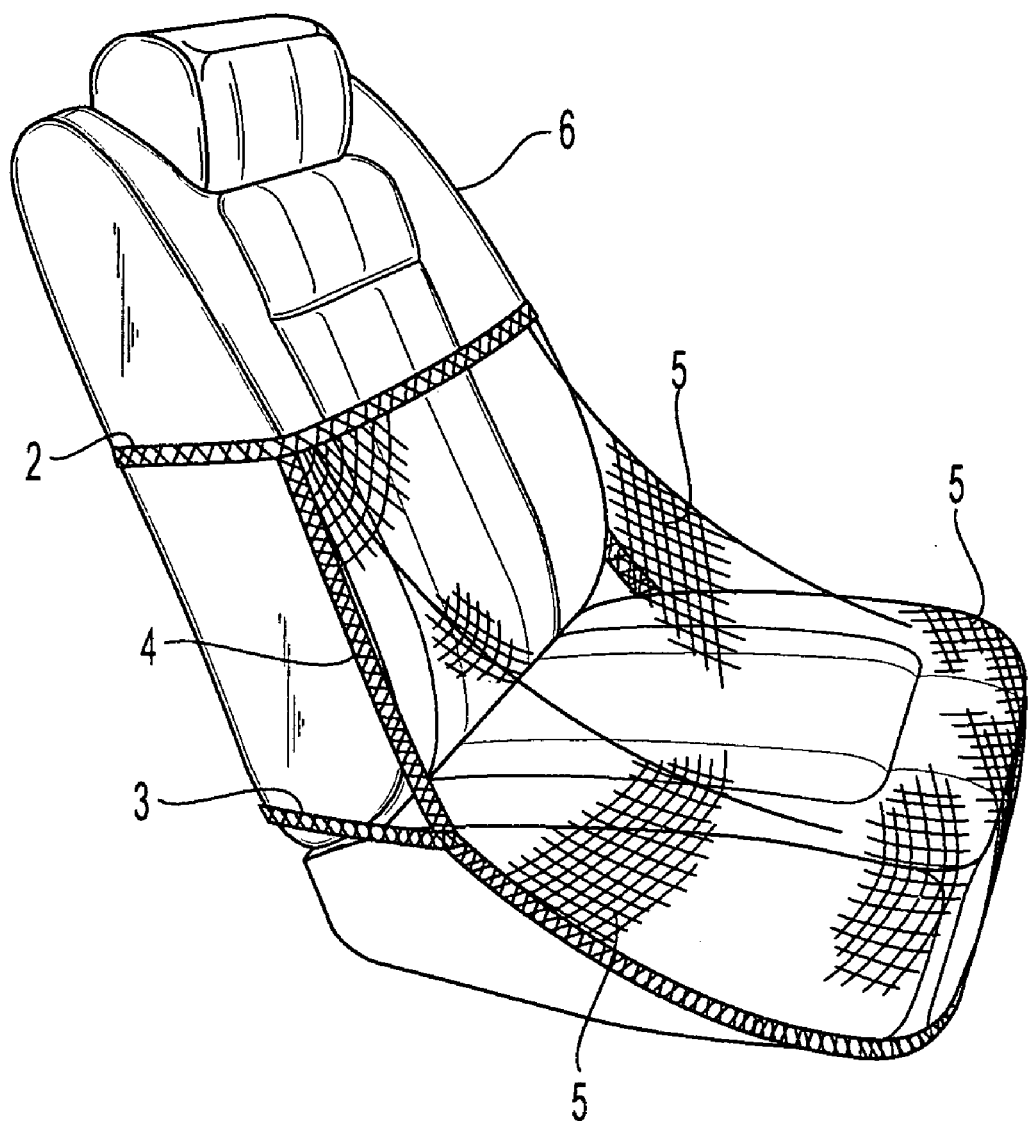
FIG. 2 is a perspective view of the Seat Net attached to an automobile bucket-style seat.

FIG. 2 shows a perspective illustration of the Seat Net 1 installed over a bucket-style seat 6. The mesh material is cut in a shape so that, when joined to the upper strap 2 and loop strap 5, it fits around a bucket-style automobile seat 6. The mesh material 5 is preferably constructed of an expandable material to allow for easy installation around the horizontal portion of bucket-style seat 6. Upper seat strap 2 and lower seat strap 3 may be slid up or down along the vertical portion of bucket-style seat 6 to provide the desired fit, based upon the size of bucket-style seat 6. Upper seat strap 2, lower seat strap 3, and loop strap 4 are all preferably constructed out of an elastic material, and attached to the mesh material 5 in an un-stretched condition to allow for tight adhesion to a bucket-style seat 6 of various sizes. The bottom portion of the loop strap 4 is placed below the underside of the horizontal portion of the bucket-style seat 6. The loop strap 4 is preferably 1.5 inches in width. The upper seat strap 2 and lower seat strap 3 are preferably 1.0 inches in width.

Figure 3:
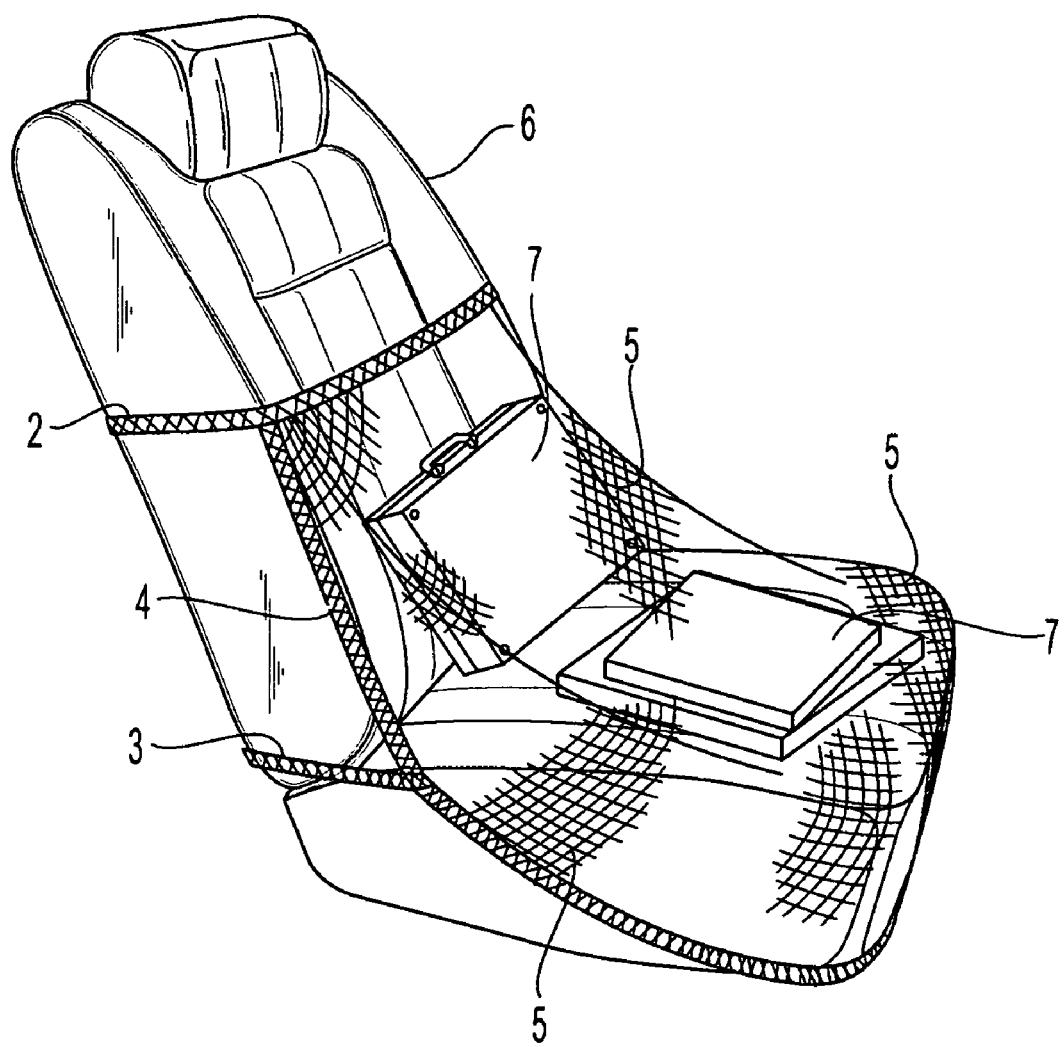
FIG. 3 is a perspective view of the Seat Net attached to an automobile seat with items stored on the automobile bucket-style seat.

Referring now to FIG. 3, the Seat Net 1 is shown installed over a bucket-style seat 6 with items 7 resting on the horizontal portion of bucket-style seat 6. The items 7 may be easily retrieved by a driver by reaching under loop strap 4 and pulling them between loop strap 4 and the vertical portion of bucket-style seat 6. The elasticity of loop strap 4 provides for a snug fit to the bucket-style seat 6 while permitting a driver easy access to the items 7. The expandable nature of mesh material 5 allows for larger items than those shown to be safely carried, while snugly fitting over the horizontal portion of bucket-style seat 6, thereby preventing items of any size from falling off bucket-style seat 6. Items 7 may be placed within the Seat Net 1 from the top, between the upper strap 2 and bucket-style seat 6 or from the side, between loop strap 4 and bucket-style seat 6.

DRAWING ITEM INDEX

1 Seat Net
2 Upper Seat Strap
3. Lower Seat Strap
4. Loop Strap
5. Mesh Material
6. Bucket-style Seat
7. Items

I claim:

1. A device for preventing items placed on an automobile's bucket-style seat from falling off the seat while maintaining easy access to the items comprising:
   a mesh material;
   a loop strap having two ends, secured to said mesh material along the lower and side perimeters of said mesh material;
   an upper seat strap having two ends, with the first end of said upper seat strap attached to one of the ends of said loop strap, said upper seat strap continuing along and attached to said mesh material along the upper perimeter of said mesh material, said upper seat strap continuing behind said mesh material, with the second end of said upper seat strap attached to the first end of said upper seat strap and one of the ends of said loop strap to create an opening between said mesh material and said upper seat strap large enough for most automobile bucket-style seats to fit therethrough; and
   a lower seat strap, attached to opposite sides of said loop strap at some distance below said upper seat strap, said lower seat strap positioned behind said mesh material and of sufficient length to create an opening between said mesh material and said lower seat strap large enough for most automobile bucket-style seats to fit therethrough.

2. The device of claim 1, wherein said mesh material comprises a stretchable material.

3. The device of claim 1, wherein said loop strap comprises an elastic or stretchable material.

4. The device of claim 1, wherein said upper seat strap comprises an elastic or stretchable material.

5. The device of claim 1, wherein said lower seat strap comprises an elastic or stretchable material.

6. The device of claim 1, wherein:
   said mesh material comprises a stretchable material;
   said loop strap comprises an elastic or stretchable material;
   said upper seat strap comprises an elastic or stretchable material; and
   said lower seat strap comprises an elastic or stretchable material.

7. The device of claim 1, wherein:
   said mesh material comprises a stretchable material;
   said loop strap comprises an elastic or stretchable material, and is 1.5 inches wide;
   said upper seat strap comprises an elastic or stretchable material, and is 1.0 inches wide; and
   said lower seat strap comprises an elastic or stretchable material, and is 1.0 inches wide.

* * * * *